United States Patent
Dluzneski

(10) Patent No.: US 6,764,612 B2
(45) Date of Patent: Jul. 20, 2004

(54) ENCAPSULATED PEROXIDE COMPOSITIONS

(75) Inventor: Peter R. Dluzneski, Harleysville, PA (US)

(73) Assignee: GEO Specialty Chemicals, Inc., Cleveland, OH (US)

( * ) Notice: Subject to any disclaimer, the term of this patent is extended or adjusted under 35 U.S.C. 154(b) by 64 days.

(21) Appl. No.: 10/306,802

(22) Filed: Nov. 27, 2002

(65) Prior Publication Data

US 2003/0178600 A1 Sep. 25, 2003

Related U.S. Application Data

(63) Continuation-in-part of application No. 10/104,472, filed on Mar. 22, 2002.

(51) Int. Cl.$^7$ ............................ C01B 15/10; C09K 15/06
(52) U.S. Cl. ............................. 252/186.26; 252/186.42; 252/186.2; 252/182.13; 252/182.29
(58) Field of Search ....................... 252/186.26, 186.42, 252/186.2, 182.13, 182.29; 510/309; 523/211, 440; 525/27

(56) References Cited

U.S. PATENT DOCUMENTS

| | | | | |
|---|---|---|---|---|
| 4,321,301 A | * | 3/1982 | Brichard et al. | 428/403 |
| 4,350,681 A | * | 9/1982 | Fulton, Jr. | 424/53 |
| 4,455,252 A | * | 6/1984 | Wylegala et al. | 252/186.26 |
| 4,515,929 A | * | 5/1985 | Tang | 526/228 |
| 4,560,495 A | * | 12/1985 | Kato | 252/186.23 |
| 4,808,639 A | * | 2/1989 | Chernack | 523/211 |
| 4,861,506 A | * | 8/1989 | Chauvier et al. | 510/375 |
| 4,917,816 A | * | 4/1990 | Self | 252/186.26 |
| 4,978,528 A | * | 12/1990 | Degre | 424/94.4 |
| 5,110,495 A | * | 5/1992 | Self | 252/186.26 |
| 5,238,978 A | * | 8/1993 | Stein | 523/351 |
| 5,536,435 A | * | 7/1996 | Chapman et al. | 510/310 |
| 6,086,785 A | * | 7/2000 | Roesler et al. | 252/186.26 |
| 6,310,117 B1 | * | 10/2001 | Sawada et al. | 523/200 |

\* cited by examiner

Primary Examiner—Joseph D. Anthony
(74) Attorney, Agent, or Firm—Rankin, Hill, Porter & Clark LLP

(57) ABSTRACT

The present invention provides supported peroxides, and a method of forming supported peroxides. Supported peroxides according to the invention are solid particles that include an organic peroxide, a metallic soap, and a polymer. In accordance with the method of the invention, supported peroxides are preferably formed by dispersing a mixture that includes at least one peroxide and at least one $C_4$ to $C_{30}$ carboxylic acid into an aqueous solution that includes a compound that is capable of reacting with the $C_4$ to $C_{30}$ carboxylic acid to form a water soluble soap. Dispersing the mixture into the aqueous solution results in the formation of an emulsion. Polymer is then added to the emulsion, and forms a polymer suspension. A polyvalent metal compound that is capable of reacting with the water soluble soap to form a water insoluble metallic soap is then added to the polymer suspension, which converts the water soluble soap into a water insoluble metallic soap that precipitates from the suspension. The organic peroxide and the polymer are entrained within the precipitate.

22 Claims, No Drawings

ENCAPSULATED PEROXIDE COMPOSITIONS

CROSS-REFERENCE TO RELATED APPLICATION

This is a continuation-in-part of application Ser. No. 10/104,472 filed Mar. 22, 2002 now allowed.

FIELD OF INVENTION

The present invention relates to supported peroxides and a method of forming supported peroxides.

BACKGROUND OF THE INVENTION

Peroxides are used in polymer chemistry for a variety of purposes including, for example, reducing the molecular weight of polymers and vulcanizing rubber. One of the problems associated with the use of peroxides is that in their pure form, peroxides have a tendency to be relatively unstable. Peroxides can break down and lose their activity while in storage. Furthermore, the decomposition and instability of peroxides can present storage and use hazards. For these reasons, peroxides are often diluted with at least one other substance, which improves the stability of the peroxide and facilitates handling. Peroxides that have been diluted with another substance are commonly referred to as "supported peroxides" in the industry.

Peroxides are commonly used to initiate polymerization and cross-link (vulcanize) polymers. In the vulcanizing process, the peroxide increases molecular weight either by causing the concatenation of monomers into polymer chains or by forming covalent bonds (cross-links) between established polymer chains. However, peroxides are not useful in cross-linking all polymers since some polymers tend to depolymerize when heated in the presence of peroxides, which leads to a reduction in molecular weight rather than an increase in molecular weight. Examples of polymers that depolymerize when heated in the presence of peroxides include polypropylene, polystyrene, and ethylene-propylene elastomers that have a high degree of blockiness of their propylene units.

Peroxides are still useful in processing this group of polymers. Since peroxides induce polymer cleavage in these applications, they can be used to enhance the melt flow properties, which can facilitate processes such as extrusion. This type of application is known as visbreaking (viscosity breaking) since the effect of the peroxide treatment is a reduction in the molecular weight and an increase in the melt flow index.

Two peroxides that are particularly useful in visbreaking are a,a'-bis(t-butylperoxy)diisopropylbenzene and 2,5-dimethyl-2,5-di(t-butylperoxy)hexane. The first is often added in the form of a 20% dispersion of the peroxide on polypropylene particles, while the latter is usually added as a liquid. One of the drawbacks of the dispersion of peroxide on polypropylene is that the dispersion must be heated to the melting point of the peroxide. Another disadvantage of the dispersion of peroxide on polypropylene is that it consists of a blend of polypropylene particles and peroxide crystals without adhesive bonding between the components. Although there is no conclusive data, it is believed that this formulation would be prone to a density stratification process in which, during transportation and storage, the more dense peroxide crystals will become more highly concentrated at the bottom of the container. Concentration variations within the container could lead to inconsistencies in processing.

Another drawback to the use of a dispersion of a peroxide on polypropylene is that the polypropylene support is prone to oxidation. It is known to persons skilled in the art that polypropylene slowly reacts with oxygen in the air to form hydroperoxides along the polymer chain. This leads to chain reactions that eventually cause the decomposition of the polypropylene. Therefore, anti-oxidants are an important component in all polypropylene formulations since they eliminate hydroperoxides as they form and scavenge polymer radicals before they are able to form hydroperoxides. In the past it has been observed that inadequate loading of anti-oxidant in the polypropylene support can lead to excessive hydroperoxide formation. The hydroperoxide level can reach sufficient levels to neutralize the anti-oxidant in the polymer being processed. This may lead to unexpected discoloration or brittleness in the final product.

A need exists for a supported peroxide product that can be easily handled, does not contain foreign contaminants such as inorganic supports or masterbatch elastomers, is available in a free-flowing powder form, is not prone to density stratification during storage, and can be manufactured and used at relatively low temperatures.

SUMMARY OF INVENTION

The present invention provides supported peroxides, and a method of forming supported peroxides. Supported peroxides according to the invention are solid particles that comprise an organic peroxide, a metallic soap, and a polymer. In accordance with the method of the invention, supported peroxides are preferably formed by dispersing a mixture comprising at least one peroxide and at least one $C_4$ to $C_{30}$ carboxylic acid into an aqueous solution containing a basic compound that is capable of reacting with the $C_4$ to $C_{30}$ carboxylic acid to form a water soluble soap. Dispersing the mixture into the aqueous solution results in the formation of an emulsion. Polymer particles are added to the emulsion, where the polymer particles become uniformly dispersed, forming a suspension. The addition of polymer is followed by the addition of a polyvalent metal compound that is capable of reacting with the water soluble soap to form a water insoluble metallic soap, which converts the water soluble soap into a water insoluble metallic soap that precipitates from the solution, along with the suspended polymer and the emulsified organic peroxide. The organic peroxide and the polymer are entrained or encapsulated within the precipitate of water insoluble metallic soap.

Supported peroxide products in accordance with the invention can comprise as much as 50% organic peroxide by weight. Supported peroxides according to the invention are in the form of easy-to-disperse powders like inorganic supported grades, but readily melt in polymers like wax-based supported grades. The powders show exceptional resistance to aggregation (clumping) even when exposed to temperatures in excess of the melting point of the peroxide. The metallic soap adds lubricity to polymer melts and thus can function as a processing aid. Supported peroxides according to the invention are formed at lower temperatures, and thus are not prone to thermal decomposition during manufacturing.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

Supported peroxide compositions according to the present invention comprise solid particles comprising an organic peroxide, at least one metallic soap, and at least one polymer. Without being held to a particular theory, applicants believe that the solid particles comprise a core consisting essentially of the organic peroxide and the polymer, and a coating layer disposed on the core that comprises the metallic soap. Scanning electron micrographs of the particles show that the coating layer is not continuous, meaning that portions of the organic peroxide and polymer core are left exposed. Rather than forming a continuous coating, the metallic soap appears to form discrete "platelets" that adhere to and form a mottled cladding over a substantial portion of the surface of the organic peroxide and polymer core.

Virtually any organic peroxide can be used in the invention. Preferably, however, the organic peroxide will be a solid at standard temperatures and pressures (25° C., 1 ATM) that has a melting point less than about 95° C., and more preferably less than about 50° C. Particularly suitable organic peroxides for use in the invention include, for example, a,a'-bis(t-butyl peroxy)-diisopropyl benzene, and 2,5-dimethyl-2,5-di(tbutylperoxy)hexane. It will be appreciated a combination of these peroxides can be used, and combinations of two or more organic peroxides can also be used.

The metallic soap in the supported peroxide composition according to the invention comprises a salt of a polyvalent metal and at least one $C_4$ to $C_{30}$ carboxylic acid. Applicants have determined supported peroxide compositions comprising polyvalent salts of at least two different $C_4$ to $C_{30}$ carboxylic acids tend to exhibit superior handling properties (e.g., anti-clumping properties) than supported peroxide compositions comprising a polyvalent salt of only one $C_4$ to $C_{30}$ carboxylic acid. This improvement is noted even when only very small amounts of a "secondary" metallic soap are present in the composition.

The presently most preferred carboxylic acids for use in the invention are stearic acid and/or palmitic acid. These "primary" carboxylic acids are preferably used in combination with smaller amounts (e.g., about 0.01% to about 5.0% by weight) of "secondary" carboxylic acids selected from the group consisting of phthalic acid, terephthalic acid, maleic acid, fumaric acid, benzoic acid, and combinations thereof. Preferred polyvalent metals are calcium, magnesium, and aluminum, with calcium being the presently most preferred polyvalent metal. Preferred metallic soaps include, for example, calcium stearate, magnesium stearate, aluminum stearate, calcium palmitate, magnesium palmitate, aluminum palmitate, calcium phthalate, magnesium phthalate, aluminum phthalate, calcium terephthalate, magnesium terephthalate, aluminum terephthalate, calcium maleate, magnesium maleate, aluminum maleate, calcium fumarate, magnesium fumarate, aluminum fumarate, calcium benzoate, magnesium benzoate, and aluminum benzoate. It will be appreciated that combinations of two or more metallic soaps can also be used.

The supported peroxide composition according to the invention comprises solid particles. The particles tend to have a relatively narrow size distribution (i.e., all of the particles tend to be of substantially uniform size), with the average size of the particles being dependent upon the processing conditions (e.g., processing temperature, agitation, etc.). Typically, the particles with have an average particle size of about 500 microns. Particle size is largely determined by the size of the polymer particles dispersed in the emulsion. Particles within this size range are easy to handle, and readily melt into and disperse in polymers.

The solid particles preferably comprise from about 5% to about 50% organic peroxide by weight, and most preferably from about 10% to about 20% organic peroxide by weight. The solid particles further comprise from about 5% to about 80% polymer by weight, most preferably from about 45% to about 75% polymer by weight, and from about 15% to about 50% metallic soap by weight, most preferably from about 15% to about 25% metallic soap by weight. Optionally, the solid particles comprise from about 0.1% to about 5% anti-oxidant by weight, most preferably from about 0.1% to about 2% anti-oxidant by weight. The solid particles can further comprise up to a total of about 50% by weight of one or more optional substances such as, for example, co-agents, anti-scorch agents, anti-ozonants, and UV light stabilizers.

In accordance with the method of forming supported peroxides according to the invention, a mixture comprising an organic peroxide and a $C_4$ to $C_{30}$ carboxylic acid is formed. Suitable organic peroxides for use in the invention have previously been discussed above. It will be appreciated that the $C_4$ to $C_{30}$ carboxylic acids can be any form of carboxylic acids including, but not limited to fatty acids, dicarboxylic acids, branched-chain, and substituted carboxylic acids. Suitable $C_4$ to $C_{30}$ carboxylic acids include, for example: saturated carboxylic acids such as butyric, caproic, caprylic, capric, lauric, myristic, palmitic, stearic, arachic, behenic, lignoceric, and cerotic acids; unsaturated carboxylic acids such as butenoic, methacrylic, octenoic, caproleic, undecylenic, myristoleic, palmitoleic, oleic, erucic, linoleic, linolenic, arachodonic, and docosahexenoic acids; aromatic carboxylic acids such as benzoic and toluic acids; and dicarboxylic acids such as malonic, maleic, fumaric, succinic, adipic, phthalic, terephthalic, isophthalic, and itaconic acids. It will be appreciated that combinations of two or more $C_4$ to $C_{30}$ carboxylic acids can be used. The mixture of organic peroxide and $C_4$ to $C_{30}$ carboxylic acid(s) is preferably heated to a temperature that is slightly above the melting point of the organic peroxide to facilitate good mixing and the formation of a uniform homogeneous mixture.

The mixture of organic peroxide and $C_4$ to $C_{30}$ carboxylic acids may also contain an anti-oxidant. The anti-oxidant greatly reduces or eliminates hydroperoxides that slowly form when polymers such as polypropylene are exposed to air. An antioxidant such as butylated hydroxytoluene may be added in an appropriate amount to prevent excessive hydroperoxide formation in the polymer-containing supported peroxide final product.

The heated mixture of organic peroxide and $C_4$ to $C_{30}$ carboxylic acid is dispersed in an aqueous solution that comprises a compound that is capable of reacting with the $C_4$ to $C_{30}$ carboxylic acid to form a water soluble soap. The compound that is capable of reacting with the $C_4$ to $C_{30}$ carboxylic acid to form a water soluble soap will preferably comprise a water soluble base such as sodium hydroxide, potassium hydroxide, or ammonium hydroxide. In a preferred embodiment of the invention, the aqueous solution further comprises the "secondary" $C_4$ to $C_{30}$ carboxylic acid.

Preferably, the heated mixture is added to the aqueous solution under constant stirring to promote the formation of an emulsion. To facilitate the formation of an emulsion, it is preferable for the aqueous solution to also be heated to a temperature slightly above the melting point of the organic peroxide. The aqueous solution will preferably only comprise the minimum amount of the compound that is capable of reacting with the $C_4$ to $C_{30}$ carboxylic acid to form a water soluble soap necessary to neutralize all of the $C_4$ to $C_{30}$ carboxylic acids (i.e., primary and secondary) in the emulsion. If the ratio of base to total equivalents of $C_4$ to $C_{30}$ carboxylic acids is less than about 1, incomplete emulsification ("creaming") will likely occur. If the ratio of base to total equivalents of $C_4$ to $C_{30}$ carboxylic acids is greater than about 1.5, significant amounts of base will remain in the aqueous solution, which can present waste treatment problems. Accordingly, the preferred ratio of base to total equivalents of $C_4$ to $C_{30}$ carboxylic acids is from about 1.0 to about 1.2.

After the heated mixture has been dispersed in the aqueous solution, powdered polymer is added to the emulsion. Polymers suitable for this application include polymers that are cleaved by peroxides and halobutyl rubbers. Examples of such polymers include polypropylene, polystyrene, polyisobutylene, butyl rubber (copolymer of isobutylene and isoprene), chlorobutyl rubber, and bromobutyl rubber. The polymer is preferably in powder form. Upon addition of polymer to the emulsion, the emulsion and polymer are stirred to evenly distribute the polymer particles and form a polymer suspension.

After the addition of polymer and formation of a polymer suspension, the polymer suspension is preferably cooled to a temperature below the melting point of the organic peroxide. Without being bound to a particular theory, applicants believe that the organic peroxide and the polymer adhere to each other and become trapped within micelles. These micelles are formed when the water soluble soap coats at least a portion of the organic peroxide and polymer particles at the interface with the aqueous solution. The individual micelles contain organic peroxide that is adhered to a polymer particle, which later forms the cores of the solid particles. As the polymer suspension cools to a temperature below the melting point of the organic peroxide, the organic peroxide solidifies (and perhaps crystallizes) within the micelles.

After the polymer suspension has cooled to a temperature below the melting point of the organic peroxide, a polyvalent metal salt that is capable of reacting with a water soluble soap to form a water insoluble metallic soap is added. Preferred polyvalent metal cations that can be used for this purpose include: alkaline-earth metals such as beryllium, magnesium, calcium, strontium, and barium; transition metals such as titanium, vanadium, chromium, manganese, iron, cobalt, nickel, copper, zinc, zirconium, molybdenum, palladium, cadmium, and mercury; and other metals such as aluminum, gallium, tin, lead, and lanthanoid metals. Calcium salts are preferred, with calcium chloride and/or calcium sulfate being presently most preferred. Combinations of two or more polyvalent metal compounds can be used, if desired.

Addition of the polyvalent metal compound causes the water soluble soap to convert to a water insoluble metallic soap, which precipitates from the aqueous solution. As used throughout the specification and in the appended claims, the term "water insoluble" means that the metallic soap has a solubility in water at 25° C. of less than about 2.0%.

As noted above, without being held to a particular theory, applicants believe that each of the solid particles comprises a core consisting essentially of the organic peroxide and the polymer and a coating layer disposed on the core that comprises the metallic soap. Scanning electron micrographs of the particles show that the coating layer is not continuous, meaning that portions of the organic peroxide and polymer core are left exposed. Rather than forming a continuous coating, the metallic soap appears to form discrete "platelets" that adhere to and form a mottled cladding over a substantial portion of the surface of the core. The precipitate can be separated from the aqueous solution by vacuum filtration or other conventional separation means. The resulting powder can, but need not, be washed and dried.

Supported peroxide products in accordance with the invention can comprise from about 5% by weight to about 50% by weight of organic peroxide. Supported peroxides according to the invention are more resistant to clumping due to the anti-blocking properties imparted by the metallic soap. Supported peroxides according to the invention are in the form of easily handled and easy-to-disperse powders like inorganic supported grades, but readily melt in polymers like wax-based supported grades. The metallic soap adds lubricity to polymer melts and thus can function as a processing aid. Supported peroxides according to the invention are formed at lower temperatures, and thus are not prone to thermal decomposition during formation. The organic peroxide, the polymer and the metallic soap are co-precipitated as discrete particles in which these components are bonded together. This feature is believed to prevent concentration stratification during storage.

The following example is intended only to illustrate the invention and should not be construed as imposing any limitations upon the claims.

EXAMPLE

A Supported Peroxide was formed by mixing 10.0 grams of a,a'-bis(tertbutylperoxy)-diisopropylbenzene (available from GEO Specialty Chemicals of Cleveland, Ohio under the trade designation VUL-CUP® R) and 1.5 grams of stearic acid together with 0.02 grams of butylated hydroxytoluene in a 4 ounce glass bottle. The mixture was heated in a water bath to 45° C. and mixed until a homogeneous liquid phase was obtained.

In a separate 600 mL beaker, 0.67 grams of solid sodium hydroxide (pellets) and 0.40 grams of phthalic acid were added to 400 mL of deionized water. The solution was heated on a hot plate to 45° C. and mixed until all solids were completely dissolved.

The heated peroxide/stearic acid mixture was added into the heated aqueous solution under constant stirring. Stirring was continued for about 5 minutes until a uniform emulsion was formed.

To the emulsion, 40.0 grams of polypropylene powder which had an average particle size in which more than 99% of the particles passed through a 60 mesh screen sieve but less than 1% passed through a 140 mesh screen (Amoco 7200 Polypropylene) was added and the emulsion and polypropylene were stirred to form a suspension. The suspension was then allowed to cool to a temperature of less than about 30° C. The suspension had a milky appearance.

After the suspension had cooled to a temperature of less than about 30° C., 0.93 grams of solid calcium chloride (dihydrate) which had been dissolved in 100 mL of water was added to the suspension under constant stirring. The calcium chloride (dihydrate) caused the suspension to break down and form a precipitate. After approximately 10 minutes, the precipitate was recovered from the solution by vacuum filtration. The precipitate was then dried.

The precipitate consisted of about 17.0% by weight a,a'-bis(tert-butylperoxy)diisopropylbenzene, about 3.0% calcium stearate, about 0.2% calcium phthalate, about 80% polypropylene, and about 0.03% butylated hydroxytoluene. The precipitate comprised a solid powder comprising a narrow distribution of particles having an average particle size which was comparable to the particle size of the polypropylene that was used.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. A supported peroxide composition comprising solid particles having a core comprising an organic peroxide and a polymer selected from the group consisting of polypropylene, polystyrene, polyisobutylene, copolymer of isobutylene and isoprene, chlorobutyl rubber and bromobutyl rubber, the core having disposed thereon a mottled cladding comprising at least one water insoluble polyvalent metallic soap.

2. The supported peroxide composition according to claim 1 wherein the organic peroxide is selected from the group consisting of a,a'-bis(t-butylperoxy) diisopropylbenzene, 2,5-dimethyl-2,5-di(t-butylperoxy) hexane, and combinations thereof.

3. The supported peroxide composition according to claim 1 wherein the solid particles comprise from about 5% by weight to about 70% by weight organic peroxide.

4. The supported peroxide compositon according to claim 1 wherein the metallic soap is selected from the group consisting of calcium stearate, magnesium stearate aluminum stearate, calcium palmitate, magnesium palmitate, aluminum palmitate, calcium phthalate, magnesium phthalate, aluminum phthalate, calcium terephalate, magnesium terephthalate, aluminum terephthalate, calcium maleate, magnesium maleate, aluminum maleate, calcium fumarate, magnesium fumarate, aluminum fumarate, calcium benzoate, magnesium benzoate, and aluminum benzoate, and combinations of two or more thereof.

5. The supported peroxide composition according to claim 1 wherein the solid particles comprise from about 15% by weight to about 50% by weight meatllic soap.

6. The supported peroxide composition according to claim 1 wherein the solid particles comprise from about 5% by weight to about 80% by weight of the polymer.

7. The supported peroxide composition according to claim 1 wherein the solid particles futher comprise up to a total of about 50% by weight of optional substances selected from the group consisting of co-agents, anti-scorch agents, anti-ozonants, UV light stabilizers, and combinations of two or more thereof.

8. The supported peroxide compostion according to claim 1 wherein the solid particles comprise 17% organic peroxide by weight, 80% polymer by weight, 3% metallic soaps by weight, and 0.03% antioxidant by weight.

9. The supported peroxide composition according to claim 1 wherein the solid particles futher comprise an anti-oxidant.

10. The supported peroxide composition according to claim 9 wherein the anti-oxidant is butylated hydroxytoluene.

11. The supported peroxide composition according to claim 9 wherein the solid particles comprise from about 0.01% by weight to about 10% by weight of the anti-oxidant.

12. A method of forming a supported peroxide composition comprising solid particles comprising: forming a mixture comprising an organic peroxide, a $C_4$ to $C_{30}$ carboxylic acid, and optionally, an anti-oxidant; forming an aqueous solution comprising a compound that is capable of reacting with the $C_4$ to $C_{30}$ carboxylic acid to form a water soluble soap; dispersing the mixture in the aqueous.

13. The method according to claim 12 wherein the mixture comprising an organic peroxide and a $C_4$ to $C_{30}$ carboxylic acid is heated to a temperature above the melting point of the organic peroxide.

14. The method according to claim 12 wherein the aqueous solution is heated to a temperature above the melting point of the organic peroxide.

15. The method according to claim 12 wherein the polymer suspension is cooled to a temperature below the melting point of the organic peroxide before the polyvalent metal compound is added to the polymer suspension.

16. The method according to claim 12 wherein the aqueous solution further comprises a secondary C4 to C30 carboxylic acid.

17. The method according to claim 12 wherein the organic peroxide is selected from the group consisting of a,a'-bis(t-butylperoxy)diisopropylbenzene, 2,5-dimethyl-2,5-di(t-butylperoxy)hexane, and combinations thereof.

18. The method according to claim 12 wherein the $C_4$ to $C_{30}$ carboxylic acid is selected from the group consisting of butyric acid, caproic acid, caprylic acid, capric acid lauric acid, myristic acid, palmitic acid, steric acid, arachic acid, behenic acid, lignoceric acid, cerotic acid, butenoic acid, methacrylic acid octenoic acid caproleic acid, undecylenic acid, myristoleic acid, palmitoleic acid, oleic acid, erucic acid, linoleic acid,linolenic acid, arachodonic acid, docosahexenoic acid, benzoic acid, toluic acid, malonic acid, maleic acid, fumaric acid, succinic acid, adipic acid, phthalic acid, terephthalic acid, isophthalic acid, itaconic acid, and combinations of two or more thereof.

19. The method according to claim 12 futher comprising recovering and drying the precipitate.

20. The method according to claim 12 wherein the precipitate comprises 17% organic peroxide by weight 80% polymer by weight, 3% metallic soaps by weight, and 0.03% antioxidant by weight.

21. The method according to claim 12 wherein the polyvalent metal compound is selected from the group of salts consisting of calcium salts, aluminum salts, magnesium salts, zinc salts, beryllium salts, strontium salts, barium salts, titanium salts, vanadium salts, chromium salts, manganese salts, iron salts, cobalt salts, nickel salts, copper salts, zirconium salts, molybdenum salts, palladium salts cadmium salts, mercury salts, gallium salts, tin salts, lead salts, and combinations of two or more thereof.

22. The method according to claim 21 wherein the polyvalent metal compound comprises calcium chloride, calcium sulfate, or magnesium sulfate.

* * * * *